United States Patent [19]

Rivollet et al.

[11] 4,393,284

[45] Jul. 12, 1983

[54] DIRECT-CURRENT ELECTRIC SWITCH

[75] Inventors: Marc Rivollet; Pierre Monzer, both of Oyonnax, France

[73] Assignee: Etablissements Fernand Berchet, Oyonnax, France

[21] Appl. No.: 322,755

[22] Filed: Nov. 19, 1981

[30] Foreign Application Priority Data

Nov. 21, 1980 [FR] France .............................. 80 25023

[51] Int. Cl.³ .............................................. F21V 23/04
[52] U.S. Cl. ..................................... 200/60; 362/189; 362/200; 362/205; 46/45
[58] Field of Search .............. 200/51 R, 51.14, 51.16, 200/60; 362/189, 200, 205; 46/45

[56] References Cited

U.S. PATENT DOCUMENTS

| | | | |
|---|---|---|---|
| 2,522,660 | 9/1950 | Bledsoe | 362/189 |
| 2,542,613 | 2/1951 | Aufiero | 200/60 |
| 2,714,152 | 7/1955 | Ackerman et al. | 362/189 |
| 3,105,233 | 9/1963 | D'Amore et al. | 200/60 |
| 3,720,825 | 3/1973 | Franc | 362/189 |
| 3,737,648 | 6/1973 | Franc | 362/189 |
| 4,314,317 | 2/1982 | Robson | 362/189 |

OTHER PUBLICATIONS

French Republic Search Report–Jul. 16, 1981.

*Primary Examiner*—John W. Shepperd
*Attorney, Agent, or Firm*—Parkhurst & Oliff

[57] ABSTRACT

An electric switch comprising two parallel blades (1) and (2) between which is placed a battery (3), these two blades being connected by a bending-connecting blade shaped like a V (4). The blade (1) comprises at its end a receptacle (8) connecting one of the poles (10) of the battery (3) to the load (light bulb, motor). The other flexible blade (2) comprises at its end a means (13-14) to make electrical contact with this receptacle (8).

11 Claims, 5 Drawing Figures

DIRECT-CURRENT ELECTRIC SWITCH

This invention concerns an electric switch for batteries and the like.

As is known, an electric switch is a make-and-break contact for different electric circuits or apparatus. In the present case, this switch makes an electric connection and thus passes the current from the direct-current (DC) electric source such as a battery, cell, storage cell or the like, to the load drawing this current, such as a light bulb, motor etc.

Up until the present, two approaches have been used as a rule to make these connections. A first approach utilizes electric wires. While this flexible connection offers many advantages, its main drawback is its high cost.

The second approach, and the approach which is most commonly used today, employs flexible metal blades often called contact blades. Although very common in all apparatus employing batteries, for instance toys or portable lighting (flashlights etc.), this solution suffers from serious drawbacks, including the following:

- since the blades lack elasticity, reliability drops with time;
- only a limited design variation is possible;
- the need to use several blades of suitable shapes to make one connection and the mandatory presence of a breaking element along with insulated latching means;
- the difficulty in meeting the battery dimensional tolerances;
- the poor resistance to repeated impacts limits their application in the toy industry which requires some impact tolerance for certain uses even though this industry has a strong need for this type of product;
- high cost, which is primarily due to rather inaccurate methods used in bending the blades and in handling the assembly.

There is increasing demand for switches for electric batteries and the like which are more reliable, more resistant, more miniaturized and cheaper to produce. The object of the invention is to develop this type of a product.

This invention concerns a new electric switch for making contact between a DC source (cell, battery, rechargeable battery) and a load drawing this current (motor, light bulb, etc.). This switch is characterized by being made from an insulating, semi-rigid, plastic integral piece coated with a conducting substance, comprising two parallel blades located on either side of the DC source and provided with means keeping this source in place, said blades being joined to each other at their bases by a bending-connecting blade for the purpose of, on one hand, to make contact with one of the poles of the electric source, and on the other hand, to absorb both the dimensional variations of this electric source and the impact energy in case of dropping. One of the blades is fixed in place, and at its end comprises a means to make contact between the other pole of the electric source and the load, comprising furthermore along its length an electrical break in the current path. The other blade is flexible and is provided at its end with a means to make contact with the load while acting as the bending blade for said means to make contact. With respect to this invention, it is advantageous if:

- the means for keeping the electric source in place between the two blades comprises clips or jaws integrally molded in each of the sides opposite the blades;
- the bending-connecting blade assumes the general shape of an inverted V rounded-off at its tip and connected by its arms to the base of the two parallel blades, the rounded-off tip of the V ensuring the contact with the particular pole of the electric source;
- the means making contact between the other pole of the electric source and the load located at the end of the fixed blade is a receptacle connected to the end of one blade and seating the load;
- with respect to a light bulb, this receptacle, which is integrally molded, acts as a socket for the base of the bulb;
- in the case of an electric motor, this receptacle seats the motors's metal casing acting as one of its terminals;
- the electric break in the current path in this blade assumes either the form of a lacquer layer or is molded or machined in a particular way in this fixed blade, or cut out of it (for instance a narrow groove which is deeper than it is wide), so as to subsequently prevent the deposition of a conductive layer;
- the means for making contact between the end of the flexible blade and the load is a push-means integrally molded in the end of this flexible blade; this push-means makes transient or continuous contact with latching;
- the permissible elastic elongation coefficient of this flexible blade and that of the bending-connecting blade are as close as possible to that of the conducting coating.

Known plastic substances may be used provided they will not break and are suitable to form blades capable of some bending under conditions of operation while permitting coating with an electrical conductor. As a practical matter, ABS or styrene resins may be used.

As already mentioned, the piece must be integral. The piece may be made in the following manner, using known techniques, such as injection for plastics processing.

Either known coatings or paints may be used for the conducting layer. As a practical matter, the cover coating may be performed by electro-deposition. Also, as already mentioned, the permissible elastic coefficient of elongation for the flexible blade and for the bending-connecting blade are as close as possible to that of the conducting layer. In fact, the bending of these two blades is computed so they will be adapted to the least elongation.

The dimensions of the piece (width, thickness, length of the blades, etc.) are computed in view of the particular application.

While as a rule cylindrical batteries are used as sources of electric current, small batteries or micro-rechargeable cells may also be used.

The manner of implementing the invention and the advantages resulting from it will be better understood in the light of the illustrative examples below, which are provided in a non-restrictive manner.

Figure 1:
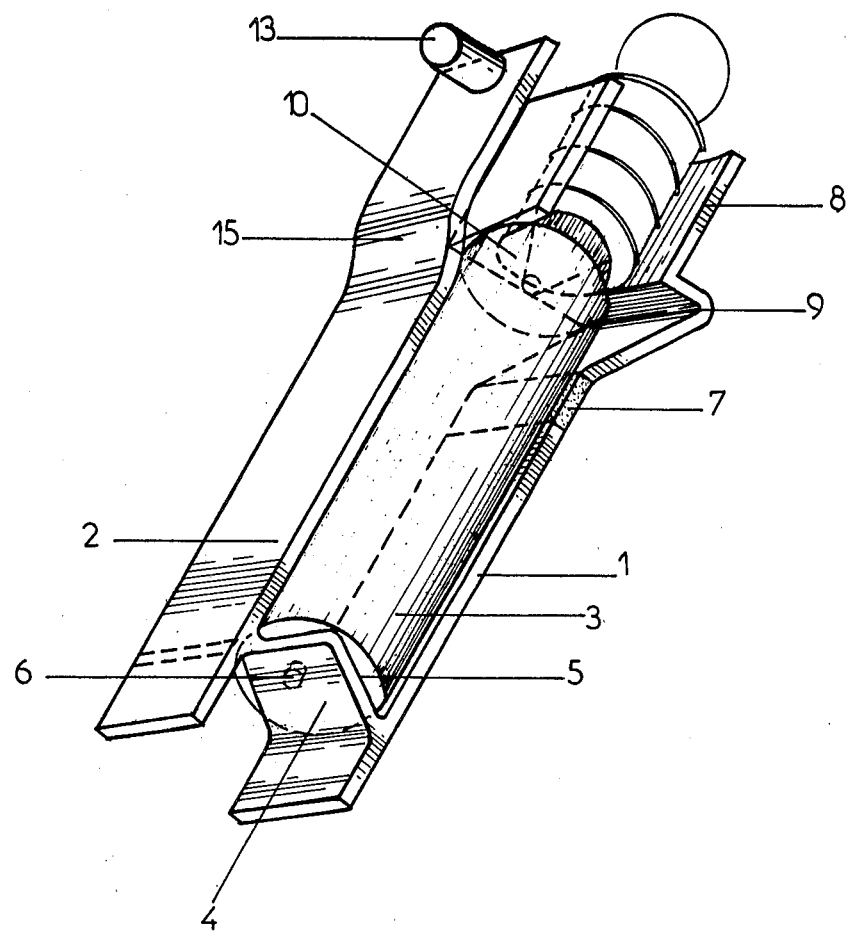
FIG. 1 is a perspective view roughly showing an electric switch of the invention.
Figure 2:
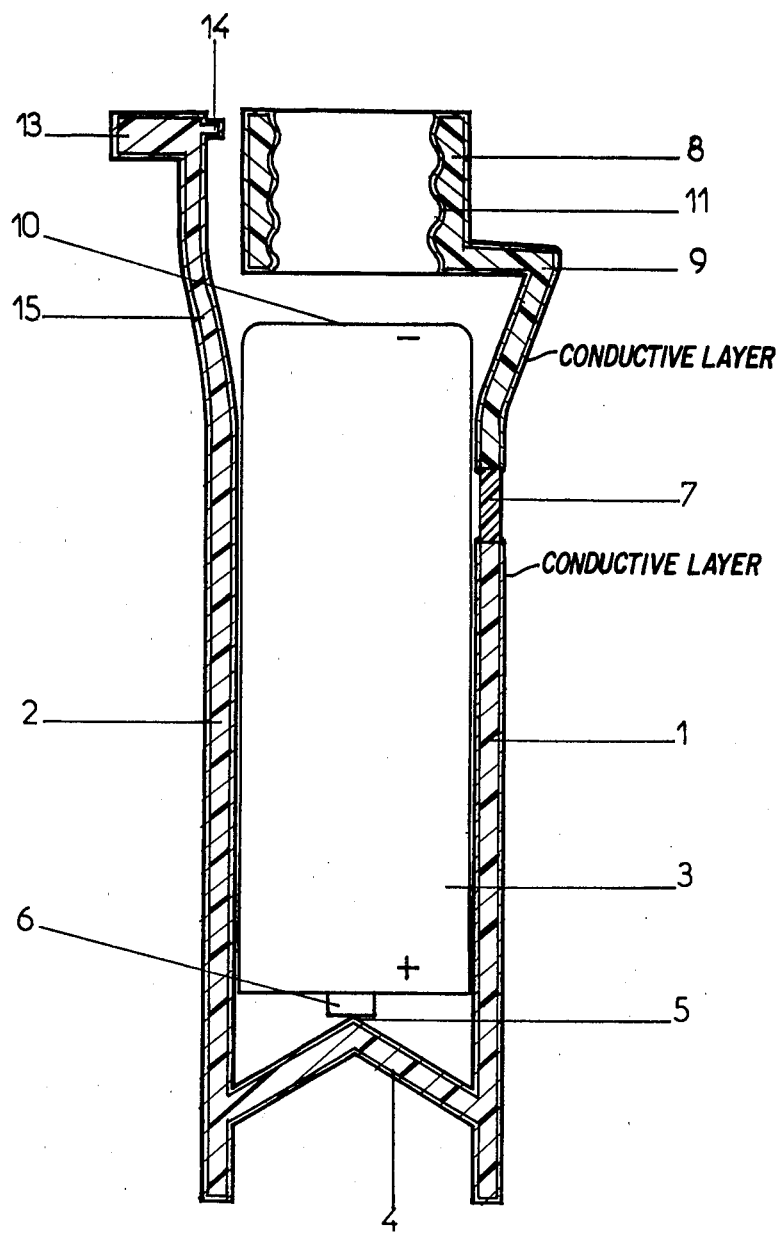
FIG. 2 is a longitudinal section of this switch of FIG. 1.

The electric switch shown in FIGS. 1 and 2 comprises an ABS resin integral piece coated with an electrodeposited copper layer on its entire surface except for the non-conducting portion 7 which is defined below. This piece consists of two blades, respectively a so-called fixed blade 1, and a so-called flexible blade 2 which is at least flexible at its free end and of which the mutual spacing slightly exceeds the diameter of the battery 3 which forms the electric source.

These blades 1 and 2 are connected at their bases by a bending blade 4 in the shape of a rounded-off V 5, this rounded segment receiving the pole 6 of the battery 3.

The so-called fixed blade 1 comprises:

a non-conducting portion 7, which is manufactured by covering it with a suitable lacquer prior to electrodepositing this portion, and at its end a receptacle 8 to electrically connect the terminal 10 of the battery 3 with the load;

the junction between the blade 1 proper and this receptacle 8 is implemented by an elbow means 9 which absorbs the dimensional tolerances.

Figure 3:
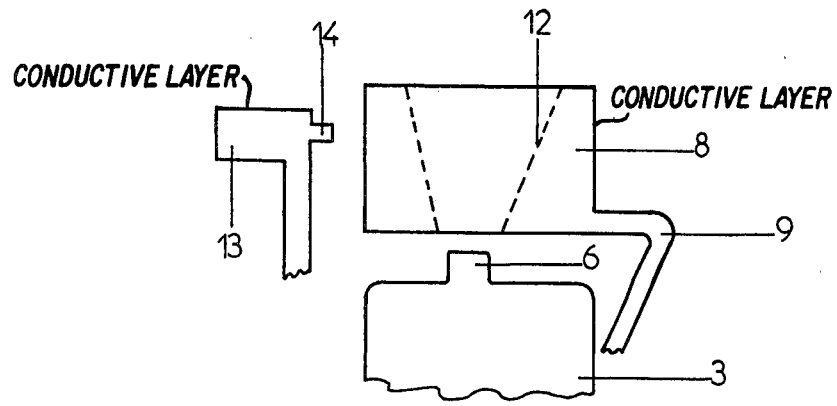
FIG. 3 is another embodiment of this switch.

When the load is an electric light bulb (FIGS. 1 and 2), the receptacle 8 is cylindrical and is provided on its inside with helical grooves 11 directly obtained by molding for the purpose of screwing-in the base of this bulb. If the load is an electric motor (FIG. 3), the receptacle may be flaring as indicated by 12 so as to receive the motor's metal frame for connecting an engine driven by electricity.

The flexible blade 2 is provided at its end with a push means consisting of two parts 13 and 14 integrally molded into button-shapes. The bent part 15 allows the blade 2 to be bent by a mere manual or controlled pressure (transient or continuous contact) on the button 13, the opposite button 14 then making contact with the receptacle 8 and thereby electrically connecting the load (electric bulb, motor) connected to the receptacle 8 and to the pole 10 (or 6) and the other pole of the battery 3 by means of conducting coating on the integral piece.

Since the portion 7 is an electrical break, the current only passes through the flexible blade 2.

Figures 4, 5:
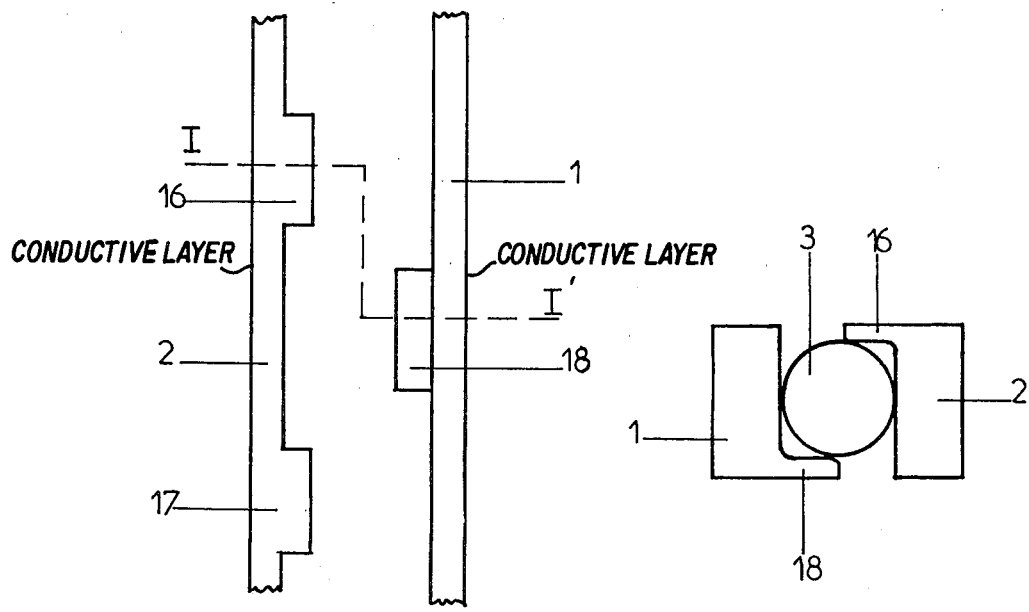
FIG. 4 is a detailed topview of the two blades enclosing the battery.
FIG. 5 is a cross-section of FIG. 4 along the axis I—I'.

In order to keep the battery 3 between the two parallel blades 1 and 2 (FIGS. 4 and 5), these blades are provided along their length with jaws 16, 17, 18 which are made by molding and which are offset from one another so as to act as clips. Similarly, to force the user to insert the battery from a preferred side, suitable elements such as holes or bosses may be provided in these blades.

This novel type of switch offers many advantages over the present-day embodiments, some of which include:

ease in manufacture and assembly resulting from the invention being integral;

an estimated one half reduction in the manufacturing cost of the present-day methods using metal blades;

ease in storing and handling;

increased reliability due to the overall accuracy;

good resistance to repeated dropping;

easy attainment of dimensional battery tolerances.

Accordingly, this switch can be successfully used where it is mandatory to electrically connect a current source with a load such as a toy or a portable lighting system.

What is claimed is:

1. An electric switch for electrically connecting a direct-current source such as a cell, a battery, or a storage battery, to a load on a direct-current which is produced from the direct-current source, comprising an insulating, semi-rigid, integral piece of plastic covered with a conducting layer, said integral piece of plastic comprising:

a first blade provided with a means for making electrical contact between a first pole of the direct-current source and the load, said first blade also being provided with an electrical break to current passage along the length of the first blade;

a second blade which is parallel to the first blade and is arranged on an opposite side of the direct-current source from the first blade, said second blade being provided with a means to make electrical contact to the load wherein said second blade acts as a flexure member for said means to make electrical contact;

a means for keeping the direct-current source located between said first and second blades, said keeping means being attached to the first and second blades; and a connecting blade capable of absorbing shock energy and dimensional variation of said direct-current source, said connecting blade being joined to the bases of said first and second blades while being in electrical contact with a second pole of the direct-current source.

2. An electric switch as defined in claim 1, wherein the means for keeping the direct-current source located between said first and second blades comprises a plurality of jaws which are integrally molded on the first and second blades and located on at least one side of each of the first and second blades which are facing each other, the plurality of jaws acting as clips for the direct-current source.

3. An electric switch as defined in claim 2, wherein the connecting blade assumes an inverted V-shape rounded off at a tip, said connecting blade being connected by its arms to the bases of the first and second blades while the tip makes electrical contact with the second pole of the direct-current source.

4. An electric switch as defined in claim 3, wherein the means to make electrical contact to the load is located at the end of the first blade and comprises a receptacle joined to the end of the first blade so as to form a seat for the load.

5. An electric switch as defined in claim 4, wherein the receptacle is integrally molded and acts as a socket for the base of an electric light bulb.

6. An electric switch as defined in claim 4, wherein the receptacle seats an electric motor's metal casing acting as one of its terminals.

7. An electric switch as defined in claims 5 or 6, wherein the electric break in the first blade comprises a layer of lacquer.

8. An electric switch as defined in claims 5 or 6, wherein the electric break in the first blade comprises a narrow groove which is deeper than it is wide.

9. An electric switch as defined in claim 7, wherein the means to make electrical contact to the load comprises a push-means integrally molded on the end of the second blade.

10. An electric switch as defined in claim 8, wherein the means to make electrical contact to the load comprises a push-means integrally molded on the end of the second blade.

11. An electric switch as defined in claim 9, wherein the first blade, the second blade, and the conducting layer each have a permissible coefficient of elastic elongation, and all of the coefficients of elastic elongation are substantially the same.

* * * * *